United States Patent
Nishizawa et al.

(10) Patent No.: US 7,688,296 B2
(45) Date of Patent: Mar. 30, 2010

(54) CHOLESTERIC LIQUID CRYSTAL DRIVING DEVICE AND DRIVING METHOD

(75) Inventors: Masato Nishizawa, Shiojiri (JP);
Kazunori Hiramatsu, Okaya (JP);
Munenori Sawada, Suwa (JP)

(73) Assignee: Seiko Epson Corporation (JP)

( * ) Notice: Subject to any disclaimer, the term of this patent is extended or adjusted under 35 U.S.C. 154(b) by 896 days.

(21) Appl. No.: 10/587,015

(22) PCT Filed: Jan. 20, 2005

(86) PCT No.: PCT/JP2005/001050

§ 371 (c)(1),
(2), (4) Date: Jul. 21, 2006

(87) PCT Pub. No.: WO2005/071472

PCT Pub. Date: Aug. 4, 2005

(65) Prior Publication Data

US 2007/0159430 A1    Jul. 12, 2007

(30) Foreign Application Priority Data

Jan. 22, 2004    (JP)    ............... 2004-014900

(51) Int. Cl.
G09G 3/36    (2006.01)
C09K 19/02    (2006.01)

(52) U.S. Cl. ............... 345/89; 345/87; 345/98; 349/169

(58) Field of Classification Search ............... 345/55–98
See application file for complete search history.

(56) References Cited

U.S. PATENT DOCUMENTS

| 6,054,974 A * | 4/2000 | Sakai et al. .................... 345/98 |
| 6,268,840 B1 * | 7/2001 | Huang .......................... 345/94 |
| 2001/0038373 A1 | 11/2001 | Yamakawa et al. |
| 2002/0057239 A1 | 5/2002 | Hiji et al. |

FOREIGN PATENT DOCUMENTS

| JP | 61-256387 A | 11/1986 |
| JP | 10-20809 A | 1/1998 |
| JP | 10-21044 A | 1/1998 |
| JP | 2002-40391 A | 2/2002 |
| JP | 2002-62520 A | 2/2002 |

OTHER PUBLICATIONS

International Search Report for PCT/JP2005/001050, ISA/JP, Mailed Mar. 8, 2005.
Written Opinion of the International Searching Authority for PCT/JP2005/001050, ISA/JP, Mailed Mar. 8, 2005.

* cited by examiner

*Primary Examiner*—Sumati Lefkowitz
*Assistant Examiner*—Charles Hicks
(74) *Attorney, Agent, or Firm*—Harness, Dickey & Pierce, P.L.C.

(57) ABSTRACT

A cholesteric liquid crystal driving device according to the present invention includes a first driving circuit for displaying one part of the image data to be displayed by a cholesteric liquid crystal on a first scanning line by driving the cholesteric liquid crystal on the first scanning line in accordance with first and second cycles; and a second driving circuit for displaying the other part of the image data to be displayed by a cholesteric liquid crystal on a second scanning line by driving the cholesteric liquid crystal on the second scanning line in accordance with a third or fourth cycle.

2 Claims, 7 Drawing Sheets

(A) P-ORIENTATION: WHITE  (B) F-ORIENTATION: BLACK  (C) H-ORIENTATION: BLACK

CHOLESTERIC LIQUID CRYSTAL DRIVING DEVICE AND DRIVING METHOD

TECHNICAL FIELD

The present invention relates to cholesteric liquid crystal driving devices and cholesteric liquid crystal driving methods.

BACKGROUND ART

A plurality of cholesteric liquid crystals is used for known cholesteric liquid crystal driving devices. The plurality of cholesteric liquid crystals is provided at intersections of a plurality of scanning lines (gate lines) and a plurality of data lines (source lines). Also, the voltage between the corresponding scanning lines and the corresponding data lines defines the screw axis of corresponding liquid crystal molecules in a P-orientation, an F-orientation, or an H-orientation.

Known cholesteric liquid crystal driving devices display images by selectively reflecting or transmitting light in accordance with the orientation. A liquid crystal driving method described in U.S. Pat. No. 5,748,277 is known.

However, since known cholesteric liquid crystal driving devices display the images, irrespective of the content of the images, by driving the cholesteric liquid crystals in accordance with a cycle including three periods, a reset period for resetting the cholesteric liquid crystals, a selection period for selecting the cholesteric liquid crystals in a desired orientation, and a holding period for holding the cholesteric liquid crystals in the desired orientation, the images cannot be displayed at high speed.

DISCLOSURE OF INVENTION

Cholesteric liquid crystal driving according to the present invention includes a detection function for detecting a first scanning line and a second scanning line, wherein, in image data having two or more gray levels to be displayed by a plurality of cholesteric liquid crystals provided at intersections of a plurality of scanning lines and a plurality of data lines, the orientation of each of the plurality of cholesteric liquid crystals being defined in a P-orientation, an F-orientation, or an H-orientation in accordance with a voltage between the corresponding scanning lines and the corresponding data lines, one part of the image data corresponding to a cholesteric liquid crystal on the first scanning line has different gray levels other than a halftone and another part of the image data corresponding to a cholesteric liquid crystal on the second scanning line has the same gray level other than the halftone; a first driving function for displaying, on the basis of a detection result for the first scanning line by the detection function, the one part of the image data to be displayed by the cholesteric liquid crystal on the first scanning line by driving the cholesteric liquid crystal on the first scanning line in accordance with a first cycle including a reset period for resetting the cholesteric liquid crystal in the H-orientation, a selection period for selecting the cholesteric liquid crystal, which is reset in the H-orientation, in a TP orientation, and a holding period for holding the cholesteric liquid crystal, which is selected in the TP orientation, in the F-orientation and in accordance with a second cycle including a reset period for resetting the cholesteric liquid crystal in the H-orientation, a selection period for selecting the cholesteric liquid crystal, which is reset in the H-orientation, in the H-orientation, and a holding period for holding the cholesteric liquid crystal, which is selected in the H-orientation, in the P-orientation; and a second driving function for displaying, on the basis of a detection result for the second scanning line by the detection function, the other part of the image data to be displayed by the cholesteric liquid crystal on the second scanning line by driving the cholesteric liquid crystal on the second scanning line in accordance with a third cycle including a reset period for resetting the cholesteric liquid crystal in the H-orientation and a holding period for holding the cholesteric liquid crystal, which is reset in the H-orientation, in the F-orientation or in accordance with a fourth cycle including a reset period for resetting the cholesteric liquid crystal in the H-orientation, the cholesteric liquid crystal, which is reset in the H-orientation, being transit to the TP orientation at the end of the reset period.

According to the cholesteric liquid crystal driving of the present invention, the first driving function drives the cholesteric liquid crystal on the first scanning line detected by the detection function in accordance with the first or second cycle, which corresponds to the known cycle, and the second driving function drives the cholesteric liquid crystal on the second scanning line detected by the detection function in accordance with the third or fourth cycle, which is shorter than the first and second cycles. Thus, the image can be displayed at a speed higher than a case where cholesteric liquid crystals are driven in accordance with the known cycle.

In the cholesteric liquid crystal driving according to the present invention, the detection function detects at least one scanning line group including two or more scanning lines, each of the scanning lines corresponding to the second scanning line, and the second driving function performs first synchronous driving for synchronously driving the two or more scanning lines included in the one scanning line group in accordance with the third cycle or the fourth cycle or performs first asynchronous driving for asynchronously driving the two or more scanning lines included in the one scanning line group in accordance with the third cycle or the fourth cycle.

In the cholesteric liquid crystal driving according to the present invention, the second driving function performs second synchronous driving for synchronously driving the two or more scanning lines included in another scanning line group in accordance with the third cycle or the fourth cycle so as to be in synchronization with the first synchronous driving or in asynchronization with the first synchronous driving.

In the cholesteric liquid crystal driving according to the present invention, the second driving function performs second asynchronous driving for asynchronously driving the two or more scanning lines included in another scanning line group in accordance with the third cycle or the fourth cycle so as to be in synchronization with the first asynchronous driving or in asynchronization with the first asynchronous driving.

BRIEF DESCRIPTION OF THE DRAWINGS

The above-mentioned and other objects, features, and advantages of the present invention will become apparent more easily from the following description of preferred embodiments of the present invention with reference to the attached drawings.

BEST MODE FOR CARRYING OUT THE INVENTION

A cholesteric liquid crystal driving device according to the present invention will be described with reference to embodiments.

Embodiments

Figure 1:
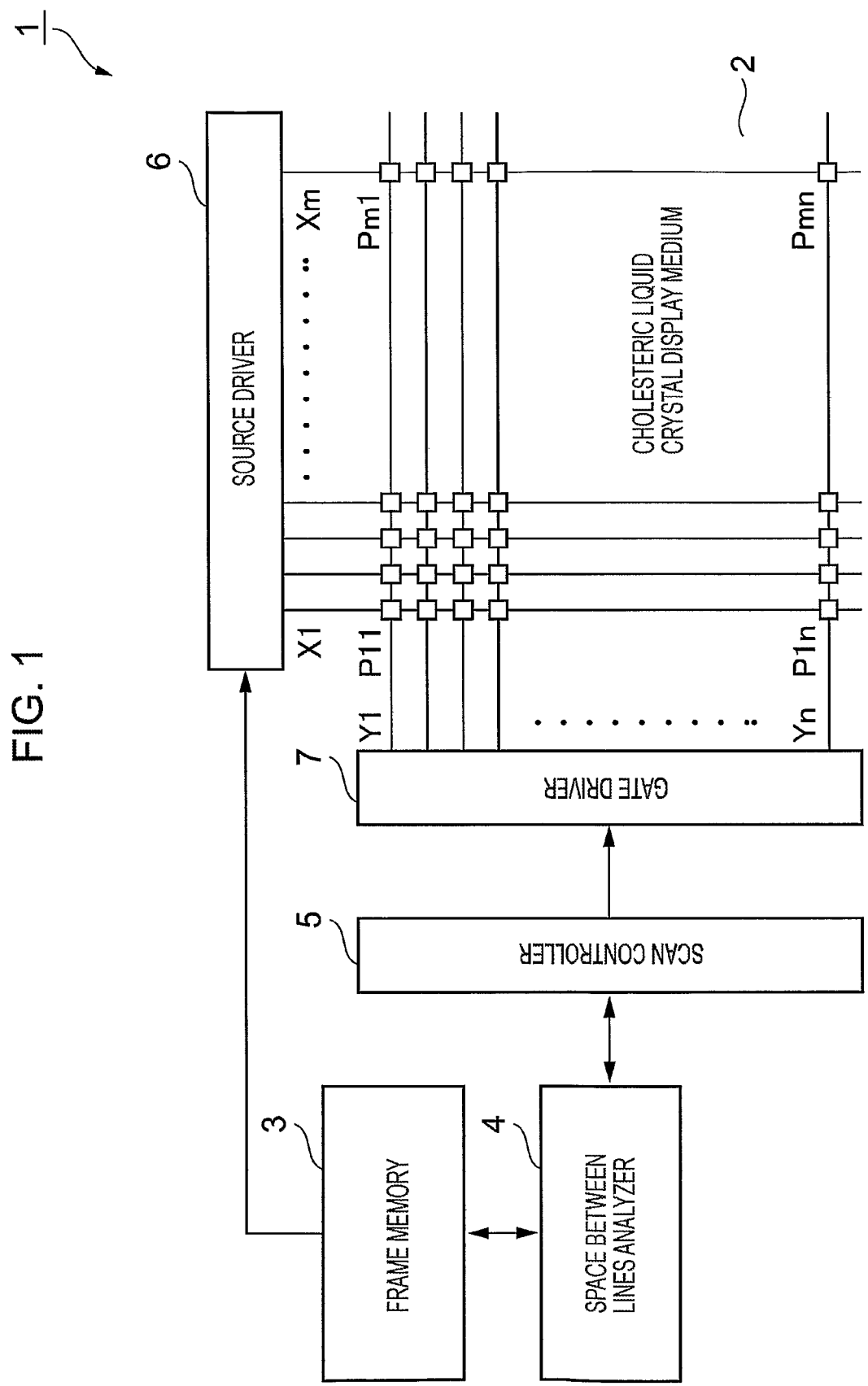
FIG. 1 is a block diagram showing the structure of an exemplary cholesteric liquid crystal driving device.
Figure 2:
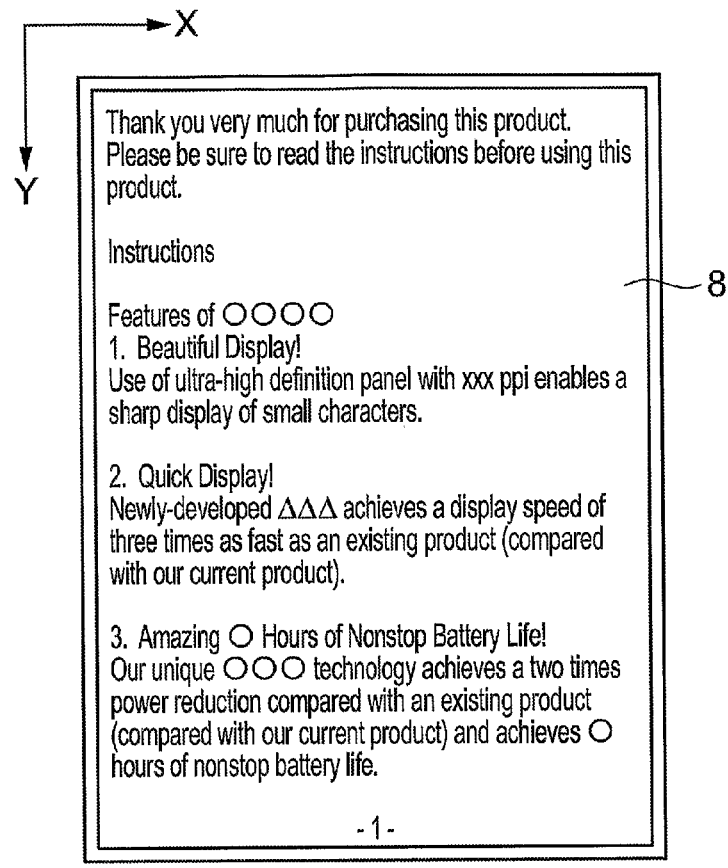
FIG. 2 illustrates an image displayed by the exemplary cholesteric liquid crystal driving device.

FIG. 1 is a block diagram showing the structure of an exemplary cholesteric liquid crystal driving device. FIG. 2 illustrates an image displayed by the exemplary cholesteric liquid crystal driving device.

An exemplary cholesteric liquid crystal driving device 1 (hereinafter, referred to as a "driving device 1") includes a cholesteric liquid crystal display medium 2, a frame memory 3, a space between lines analyzer 4, a scan controller 5, a source driver 6, and a gate driver 7, as shown in FIG. 1, so that an image 8, such as an instruction manual composed of character lines and spaces between lines (including margins), having two or more gray levels, as shown in FIG. 2, can be displayed.

The cholesteric liquid crystal display medium 2 includes a plurality of pixels P11 to Pmn provided at intersections of corresponding data lines (source lines) X1 to Xm and corresponding scanning lines (gate lines) Y1 to Yn.

Figure 3:
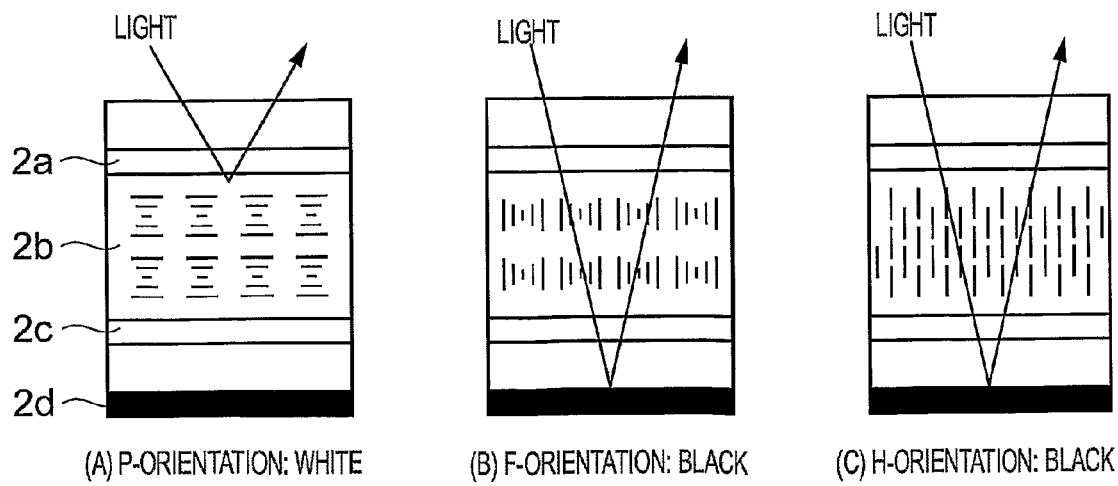
FIG. 3 includes sectional views each showing an orientation of a pixel.

FIG. 3 includes sectional views each showing an orientation of a pixel. As is known, each of the pixels P11 to Pmn includes a transparent electrode 2a, a cholesteric liquid crystal 2b, a transparent electrode 2c, and a black light-absorption layer 2d, as shown in FIG. 3. Each of the pixels P11 to Pmn selectively reflects or transmits light of a particular wavelength in accordance with a spiral pitch of a molecule of the cholesteric liquid crystal 2b, in other words, in accordance with the orientation.

The cholesteric liquid crystal 2b can be changed between a planar orientation (hereinafter, referred to as a "P-orientation") shown in FIG. 3(A), a focal conic orientation (hereinafter, referred to as an "F-orientation") shown in FIG. 3(B), and a homeotropic orientation (hereinafter, referred to as an "H-orientation") shown in FIG. 3(C). In the P-orientation shown in FIG. 3(A), the cholesteric liquid crystal 2b displays "white" in accordance with a selected reflection function. In the F-orientation shown in FIG. 3(B) and the H-orientation shown in FIG. 3(C), the cholesteric liquid crystal 2b displays "black" of the light-absorption layer 2d in accordance with a selected transmission function.

Since the P-orientation and the F-orientation are stable, the P-orientation and the F-orientation are maintained after a voltage is not applied to the cholesteric liquid crystal 2b. The cholesteric liquid crystal 2b in the H-orientation is transit to the P-orientation (hereinafter, referred to as "transient planar transition (TP orientation)" due to a sudden reduction in the applied voltage. After the transient planar transition (TP orientation), the cholesteric liquid crystal 2b is transit to the F-orientation by moderately reducing the applied voltage.

Figure 4:
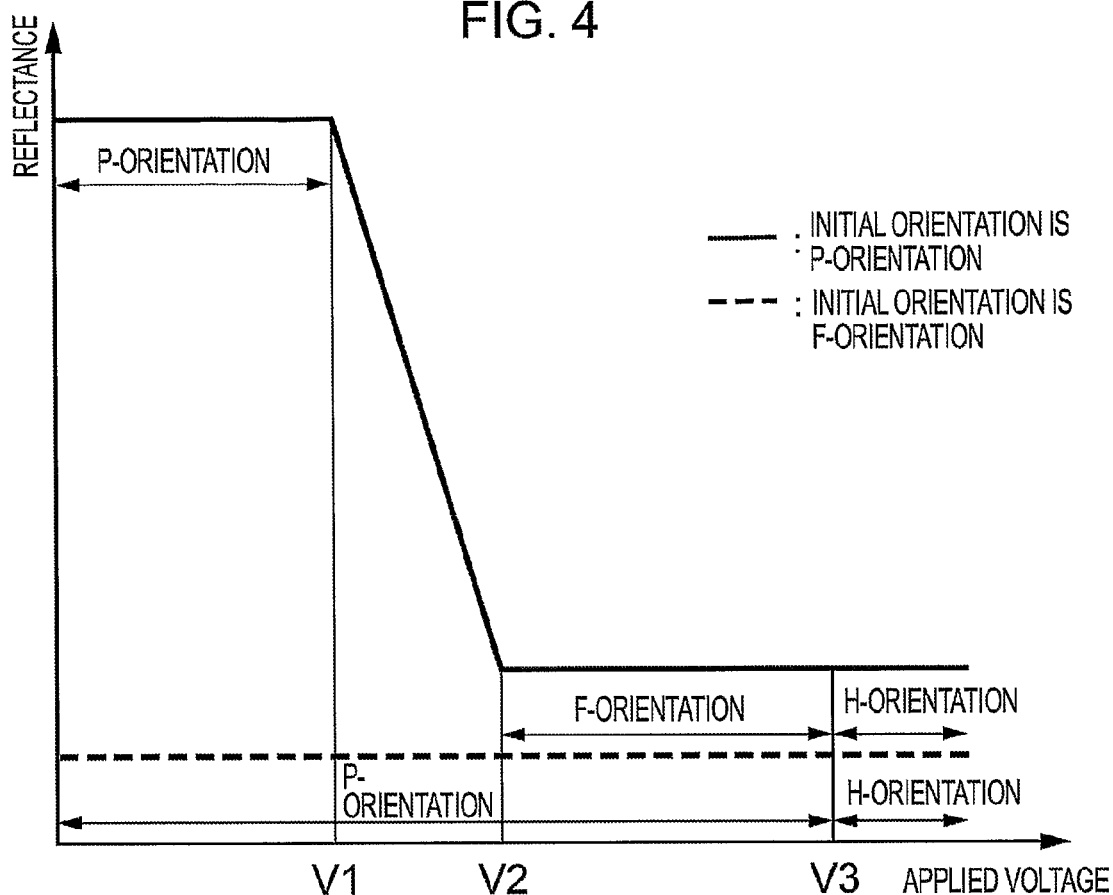
FIG. 4 is a graph showing the relationship between the voltage applied to a cholesteric liquid crystal and the type of orientation (the reflectance).

FIG. 4 is a graph showing the relationship between a voltage applied to a cholesteric liquid crystal and the type of orientation (the reflectance). When the initial orientation of the cholesteric liquid crystal 2b (the orientation after a voltage-applied state is changed to a non-voltage-applied state) is the P-orientation, if the applied voltage is from V0 to less than V1, the cholesteric liquid crystal 2b is in the P-orientation. If the applied voltage is from V1 to less than V2, the cholesteric liquid crystal 2b is transit from the P-orientation to the F-orientation. If the applied voltage is from V2 to less than V3, the cholesteric liquid crystal 2b is in the F-orientation. If the applied voltage is V3 or more, the cholesteric liquid crystal 2b is in the H-orientation. In contrast, when the initial orientation of the cholesteric liquid crystal 2b is in the P-orientation, if the applied voltage is from V0 to less than V2, the cholesteric liquid crystal 2b is in the P-orientation. If the applied voltage is V3 or more, the cholesteric liquid crystal 2b is in the H-orientation.

Referring back to FIG. 1, the frame memory 3 stores the image 8, shown in FIG. 2, to be displayed by the cholesteric liquid crystal display medium 2 using known line-sequential driving.

The space between lines analyzer 4, which is a detection circuit, analyzes whether an image part of the image 8, stored in the frame memory 3, to be scanned with the gate lines Y1 to Yn is a character line or a space between lines, in other words, whether the image part has different gray levels, each of the gray levels being other than a halftone (that is, each of the gray levels being white or black) or has the same gray level other than the halftone. More specifically, for example, if an image part to be displayed by the pixels 11 to Pm1 on the gate line Y1 has both "white" and "black", the space between lines analyzer 4 determines that the gate line Y1 is a "character line". In contrast, if the image part has "white" or "black", the space between lines analyzer 4 determines that the gate line Y1 is a "space between lines".

The scan controller 5, which includes a first driving circuit and a second driving circuit, causes the gate driver 7 to drive the gate lines Y1 to Ym in accordance with a character line driving method (FIG. 5) or a space between lines driving method (FIG. 6), which will be described below, on the basis of analysis results for the image 8 by the space between lines analyzer 4.

The source driver 6 applies data voltages corresponding to the image 8 stored in the frame memory 3 to the source lines X1 to Xm. The gate driver 7 applies gate voltages to the gate lines Y1 to Yn, under the control of the scan controller 5.

Figure 5:
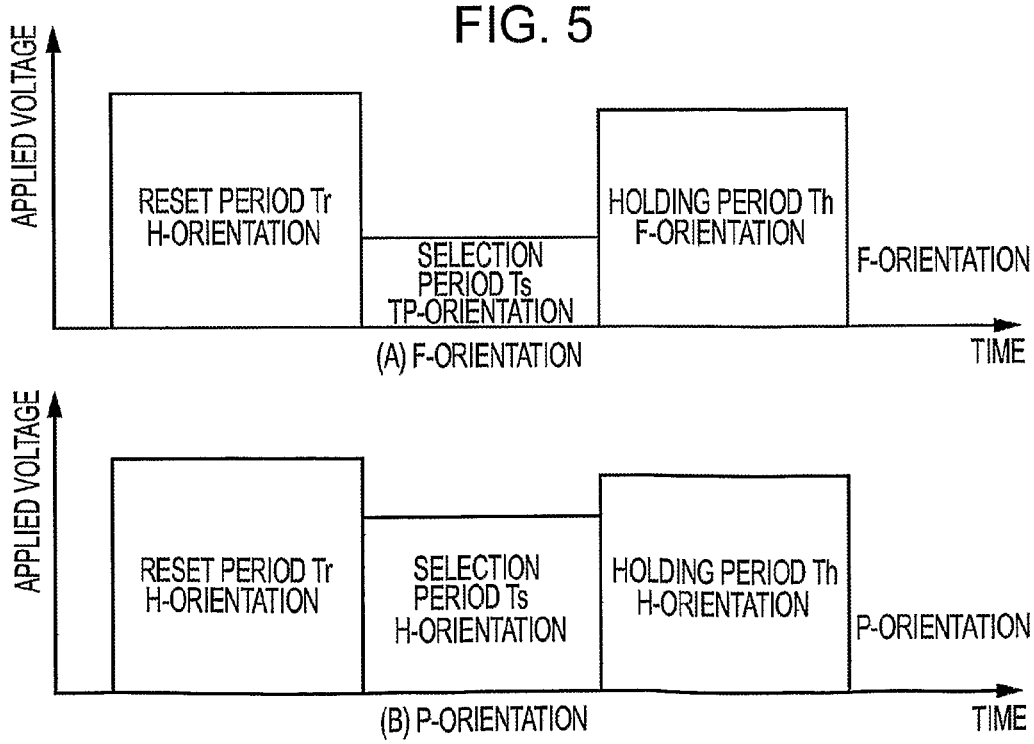
FIG. 5 includes time charts each showing a driving operation of a cholesteric liquid crystal by a character line driving method.

FIG. 5 includes time charts showing a driving operation of a cholesteric liquid crystal according to the character line driving method. According to the character line driving method, as shown in FIGS. 5(A) and (B), for example, in a cycle including three periods, a reset period Tr, a selection period Ts, and a holding period Th, by changing a voltage applied to the pixels P11 to Pm1 on the gate line Y1 every period, the orientation of the cholesteric liquid crystal 2b of each of the pixels P11 to Pm1 is changed.

More specifically, in order to display "black" by setting the cholesteric liquid crystal 2b in the F-orientation, the cholesteric liquid crystal 2b is set in the H-orientation by applying a reset voltage (V3 or more) during the reset period Tr, the cholesteric liquid crystal 2b is set in the TP-orientation by applying a selection voltage (from V1 to less than V2) during the selection period Ts, and the cholesteric liquid crystal 2b is set in the F-orientation by applying a holding voltage (from V2 to less than V3) during the holding period Th, as shown in FIG. 5(A). Accordingly, the cholesteric liquid crystal 2b is maintained in an F-orientation state, that is, a "black" state after the holding period Th. In contrast, in order to display "white" by setting the cholesteric liquid crystal 2b in the P-orientation, the cholesteric liquid crystal 2b is set in the H-orientation by applying a reset voltage (V3 or more) during the reset period Tr, the cholesteric liquid crystal 2b is kept in the H-orientation by applying a selection voltage (V3 or more) during the selection period Ts, and the cholesteric liquid crystal 2b is kept in the H-orientation by applying a voltage (V3 or more) during the holding period Th, as shown in FIG. 5(B). Accordingly, the cholesteric liquid crystal 2b is maintained in a P-orientation state, that is, a "white" state after the holding period Th.

Figure 6:
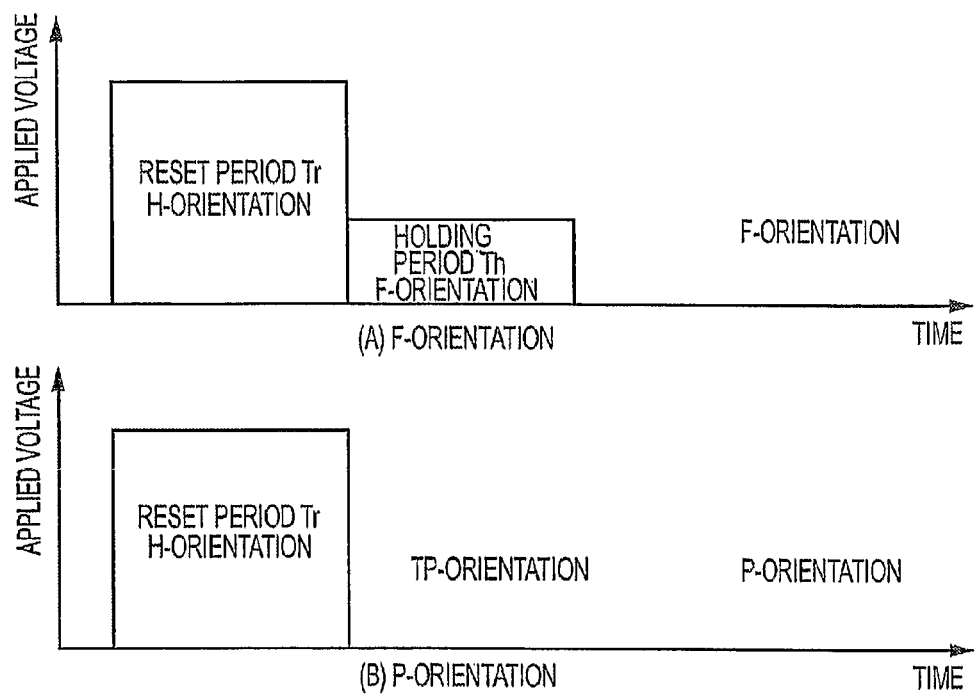
FIG. 6 includes time charts each showing a driving operation of a cholesteric liquid crystal by a space between lines driving method.

FIG. 6 includes time charts showing a driving operation of a cholesteric liquid crystal according to the space between lines driving method. According to the space between lines driving method, as shown in FIG. 6(A), for example, in a cycle including two periods, a reset period Tr and a holding period Th, by changing a voltage applied to the pixels P11 to Pm1 on the gate line Y1 every period, the orientation of the cholesteric liquid crystal 2b of each of the pixels P11 to Pm1 is changed. Also, as shown in FIG. 6(B), for example, in a cycle including only a reset period Tr, by changing a voltage applied to the pixels P11 to Pm1 on the gate line Y1, the orientation of the cholesteric liquid crystal 2b of each of the pixels P11 to Pm1 is changed.

More specifically, in the space between lines driving method, in order to display "black" by setting the cholesteric liquid crystal 2b in the F-orientation, the cholesteric liquid crystal 2b is set in the H-orientation by applying a reset voltage (V3 or more) during the reset period Tr, and the cholesteric liquid crystal 2b is set in the F-orientation by applying a holding voltage (from V2 to less than V3) during the holding period Th, as shown in FIG. 6(A). Accordingly, the cholesteric liquid crystal 2b is maintained in an F-orientation state, that is, a "black" state after the holding period Th. In contrast, in order to display "white" by setting the cholesteric liquid crystal 2b in the P-orientation, the cholesteric liquid crystal 2b is set in the H-orientation by applying a reset voltage (V3 or more) during the reset period Tr, and after the reset period Tr, the cholesteric liquid crystal 2b is transit to the P-orientation via a TP orientation, as shown in FIG. 6(B). Accordingly, the cholesteric liquid crystal 2b is maintained in a P-orientation state, that is, a "white" state.

In the character line driving method, due to line-sequential driving, in other words, for example, in order that a selection period Ts for the pixels P11 to Pm1 on the gate line Y1 does not overlap with a selection period Ts for the pixels P12 to Pm2 on the gate line Y2, the pipeline system is adopted.

Figure 7:
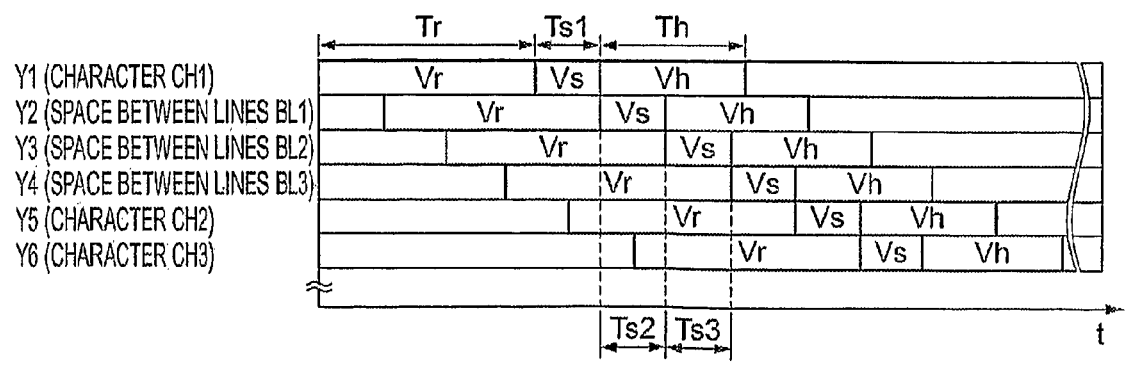
FIG. 7 is a time chart showing a driving operation by a character line driving method using a pipeline system.

FIG. 7 is a time chart showing a driving operation by the character line driving method using the pipeline system. In the character line driving method using the pipeline system, in order that selection periods Ts in which selection voltages Vs are applied do not overlap with each other between the gate lines Y1 to Yn, corresponding cycles are allocated to the gate lines Y1 to Yn. For example, a selection period Ts1 for the gate line Y1 to display a character line CH1, which is a part of the image 8, a selection period Ts2 for the gate line Y2 to display a space between line BL1, which is another part of the image 8, and a selection period Ts3 for the gate line Y3 to display a space between lines BL2, which is another part of the image 8, are arranged so as not to overlap with each other.

As described above, the driving device 1 adopts the character line driving method shown in FIG. 5 using the pipeline system shown in FIG. 7 and adopts the space between lines driving method shown in FIG. 6. The operation of the driving device 1 is described next.

Figure 8:
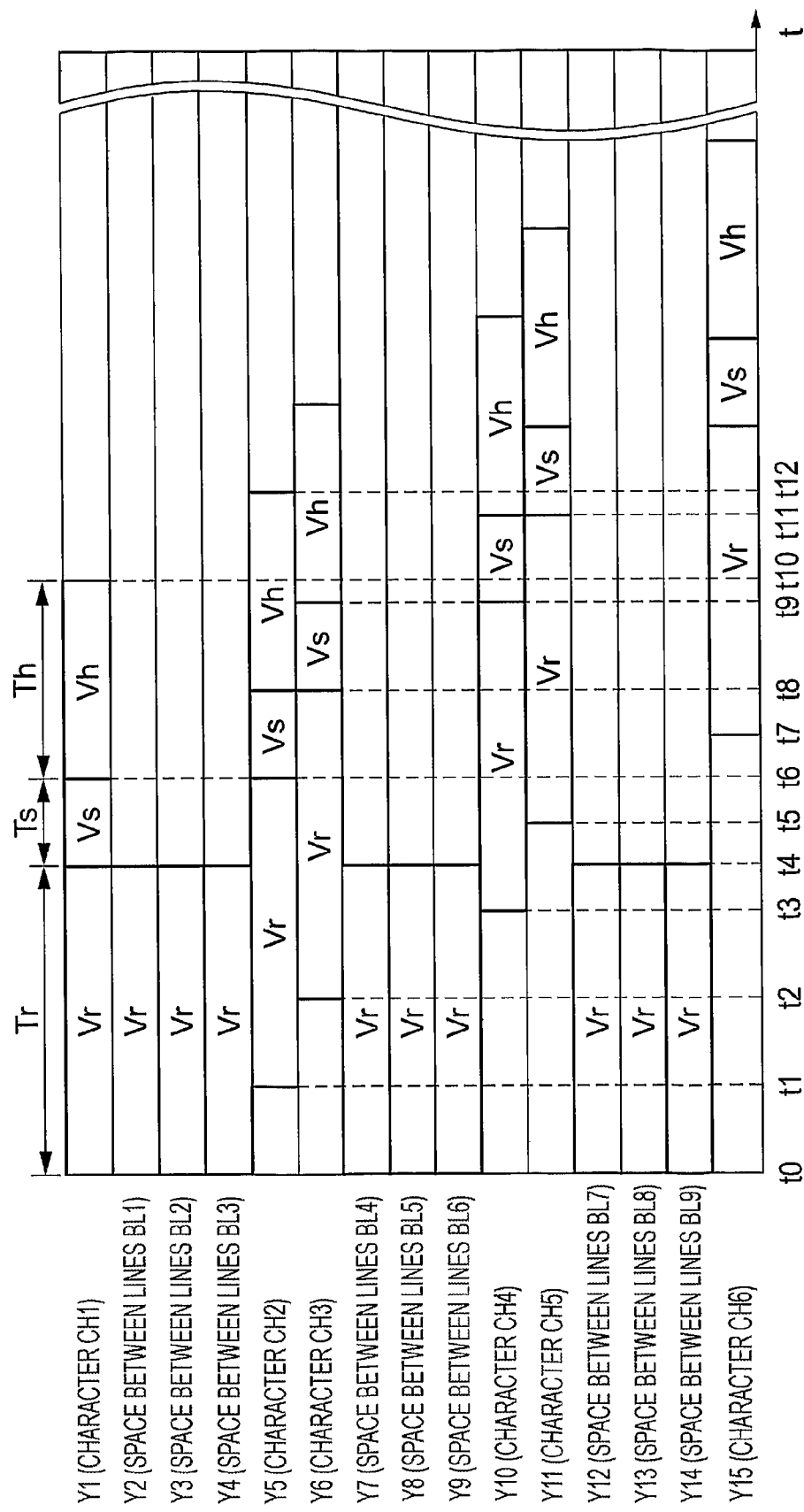
FIG. 8 is a time chart showing a driving operation of the exemplary cholesteric liquid crystal driving device.

FIG. 8 is a time chart showing a driving operation of the exemplary cholesteric liquid crystal driving device. The driving operation of the driving device 1 will be described with reference to FIG. 8. In order to facilitate explanations and understanding, for the image 8 shown in FIG. 2, it is assumed that characters and spaces between lines are regarded as "black" and "white", respectively, and that voltages applied to the pixels P11 to Pmn shown in FIG. 1 are defined only by gate voltages applied to the gate lines Y1 to Yn.

The space between lines analyzer 4 analyzes whether an image part corresponding to each of the gate lines Y1 to Yn of the image 8, stored in the frame memory 3, is a character line or a space between lines. Accordingly, the space between lines analyzer 4 finds, for example, that an image part to be displayed by the gate line Y1 is a character line CH1, image parts to be displayed by the gate lines Y2 to Y4, which constitute a scanning line group, are spaces between lines BL1 to BL3, and an image part to be displayed by the gate line Y5 is a character line CH2.

Furthermore, the space between lines analyzer 4 instructs the scan controller 5 to drive the gate line Y1, which is to display the character line CH1, in the character line driving method using the pipeline system, to drive the gate lines Y2 to Y4, which are to display the spaces between lines BL1 to BL3, in the space between lines driving method, and to drive the gate line Y5, which is to display the character line CH2, in the character line driving method using the pipeline system. The space between lines analyzer 4 also instructs the scan controller 5 to drive each of the gate lines Y6 to Yn in the character line driving method using the pipeline system or the space between lines driving method depending on whether each image part is a character line or a space between lines.

After receiving the instructions from the space between lines analyzer 4, the scan controller 5 causes the gate driver 7 to drive the gate line Y1 in the character line driving method using the pipeline system, to drive the gate lines Y2 to Y4 in the space between lines driving method, and to drive the gate line Y5 in the character line driving method using the pipeline system. The scan controller 5 also causes the gate driver 7 to drive each of the gate lines Y6 to Yn in the character line driving method using the pipeline system or the space between lines driving method.

More specifically, the gate driver 7 applies to the pixels P11 to Pm1 on the gate line Y1 a reset voltage Vr during a reset period Tr from a time t0 to a time t4, a selection voltage Vs during a selection period Ts from the time t4 to a time t6, and a holding voltage Vh during a holding period Th from the time t6 to a time t10. The gate driver 7 also applies to the pixels P12 to Pm2, P13 to Pm3, and P14 to Pm4 on the gate lines Y2 to Y4, which constitute a scanning line group, a reset voltage Vr during a reset period Tr from the time t0 to the time t4. Similarly, the gate driver 7 applies voltages to pixels on the gate lines Y7 to Y9, which constitute a scanning line group, and to pixels on the gate lines Y12 to Y14, which constitute a scanning line group. Furthermore, the gate driver 7 applies to the pixels P15 to Pm5 on the gate line Y5 a reset voltage Vr during a reset period Tr from the time t1 to the time t6, a selection voltage Vs during a selection period Ts from the time t6 to the time t8, and a holding voltage Vs during a holding period Th from the time t8 to the time t12.

In other words, (1) at the time t0, the gate driver 7 starts application of a reset voltage Vr to the gate line Y1 for the reset period Tr in the character line driving method using the pipeline system and application of a reset voltage Vr to the gate lines Y2 to Y4 for the reset period Tr in the space between lines driving method. (2) At the time t1, the gate driver 7 starts application of a reset voltage Vr to the gate line Y5 for the reset period Tr in the character line driving method using the pipeline system. (3) At the time t4, the gate driver 7 starts application of a selection voltage Vs to the gate line Y1 for the selection period Ts in the character line driving method using the pipeline system and ends the application of the reset voltage Vr to the gate lines Y2 to Y4 for the reset period Tr in the space between lines driving method. (4) At the time t6, the gate driver 7 starts application of a holding voltage Vh to the gate line Y1 for the holding period Th in the character line driving method using the pipeline system and application of a selection voltage Vs to the gate line Y5 for the selection period Ts in the character line driving method using the pipeline system. (5) At the time t8, the gate driver 7 starts application of a holding voltage Vh to the gate line Y5 for the holding period Th in the character line driving method using the pipeline system. (6) At the time t10, the gate driver 7 ends the application of the holding voltage Vh to the gate line Y1 for the holding period Th in the character line driving method using the pipeline system. (7) At the time t12, the gate driver 7 ends the application of the holding voltage Vh to the gate line Y5 for the holding period Th in the character line driving method using the pipeline system.

As described above, in the driving device 1, the space between lines analyzer 4 analyzes whether an image part corresponding to each of the gate lines Y1 to Yn of the image 8, stored in the frame memory 3, is a character line or a space between lines, and the scan controller 5 drives gate lines to display character lines in the character line driving method using the pipeline system and drives gate lines to display spaces between lines in the space between lines driving method in accordance with analysis results by the space between lines analyzer 4. The space between lines driving method is completed in a time shorter than the character line driving method. Thus, a time required for driving all the gate lines Y1 to Yn can be reduced compared with known cholesteric liquid crystal driving devices in which all the gate lines Y1 to Yn are driven in the character line driving method. In other words, the image 8 can be displayed at a speed higher than a case where a known driving device is used.

Figure 9:
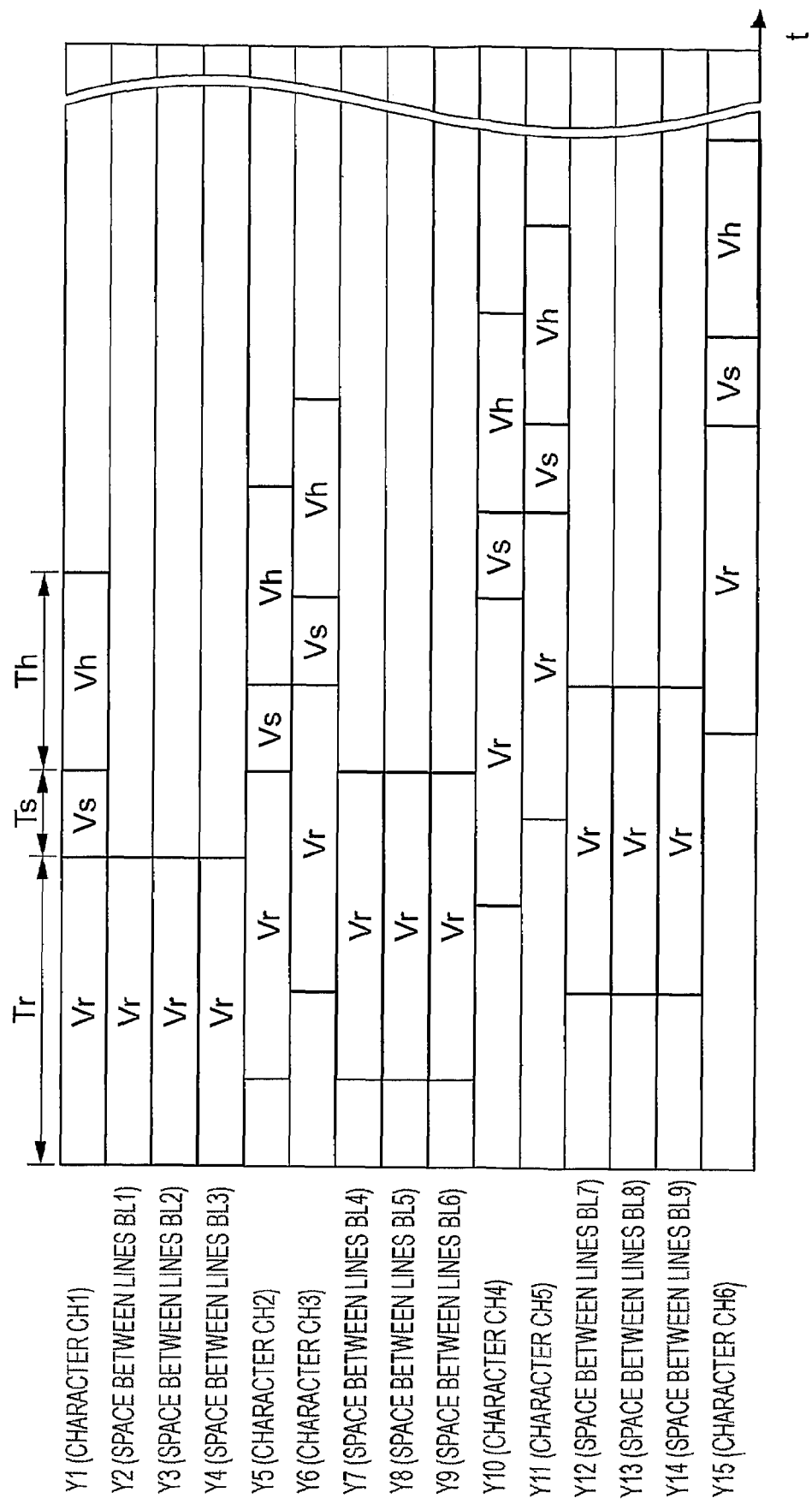
FIG. 9 is a time chart showing another driving operation of the exemplary cholesteric liquid crystal driving device.

FIG. 9 is a time chart showing another driving operation of the exemplary cholesteric liquid crystal driving device. According to the driving operation shown in FIG. 8, the cycle for driving the gate lines Y2 to Y4, which constitute a scanning line group for the spaces between lines BL1, BL2, and BL3, the cycle for driving the gate lines Y7 to Y9, which constitute a scanning line group for the spaces between lines BL4 to BL6, and the cycle for driving the gate lines Y12 to Y14, which constitute a scanning line group for the spaces between lines BL7 to BL9, are equal to each other, the spaces between lines BL1 to BL9 being parts of the image 8 shown in FIG. 2. In other words, according to the driving operation shown in FIG. 8, the cycles are synchronized with each other. However, according to the driving operation shown in FIG. 9, the cycle for driving the gate lines Y2 to Y4, the cycle for driving the gate lines Y7 to Y9, and the cycle for driving the gate lines Y12 to Y14 are shifted by the length of a selection period Ts. In other words, according to the driving operation shown in FIG. 9, driven asynchronously with each other. Accordingly, compared with the driving operation shown in FIG. 8 in which the gate lines Y2 to Y4, the gate lines Y7 to Y9, and the gate lines Y12 to Y14 are driven at the same time, fringe patterns, formed by a plurality of lines parallel to the X-direction, generated by driving the gate lines Y2 to Y4, Y7 to Y9, and Y12 to Y14 are prevented from being clear.

Figure 10:
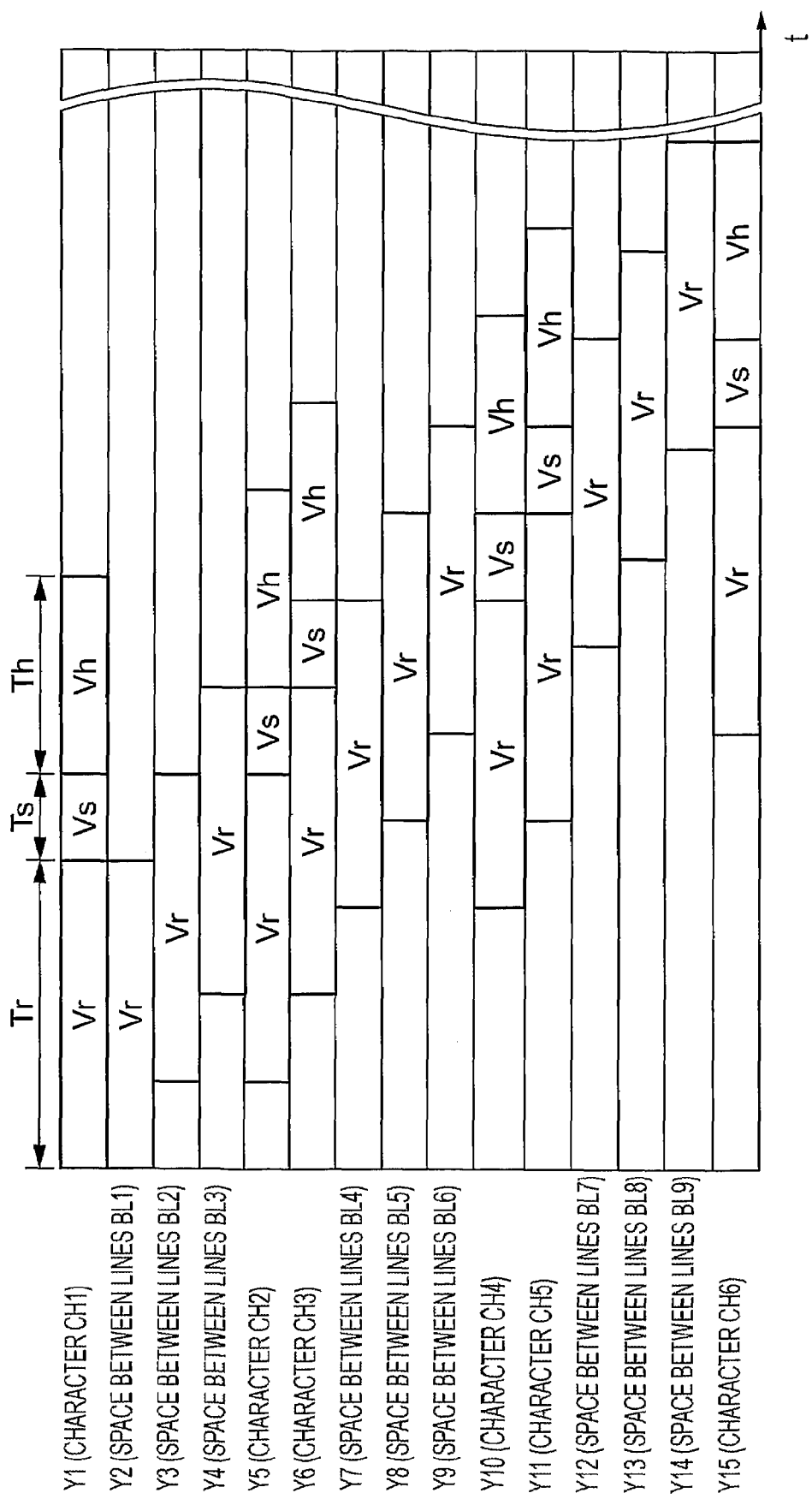
FIG. 10 is a time chart showing another driving operation of the exemplary cholesteric liquid crystal driving device.

FIG. 10 is a time chart showing another driving operation of the exemplary cholesteric liquid crystal driving device. For example, according to the driving operation shown in FIG. 9, the three gate lines Y2, Y3, and Y4, which constitute a scanning line group, the gate lines are driving at the same time, in other words, the three gate lines Y2, Y3, and Y4 are driven synchronously with each other. However, according to the driving operation shown in FIG. 10, in the driving device 1, the three gate lines Y2, Y3, and Y4 are driven so as to be shifted by the length of a selection period Ts, in other words, the three gate lines Y2, Y3, and Y4 are driven asynchronously with each other. Accordingly, compared with the driving operation shown in FIG. 9 in which the gate lines Y2 to Y4 are driven synchronously with each other, the fringe patterns are further prevented from being clear.

The invention claimed is:

1. A cholesteric liquid crystal driving device comprising:
a detection circuit for detecting a first scanning line and a second scanning line, wherein, in image data having two or more gray levels to be displayed by a plurality of cholesteric liquid crystals provided at intersections of a plurality of scanning lines and a plurality of data lines, the orientation of each of the plurality of cholesteric liquid crystals being defined in a P-orientation, an F-orientation, or an H-orientation in accordance with a voltage between the corresponding scanning lines and the corresponding data lines, one part of the image data corresponding to a cholesteric liquid crystal on the first scanning line has different gray levels other than a halftone and another part of the image data corresponding to a cholesteric liquid crystal on the second scanning line has the same gray level other than the halftone;
a first driving circuit for displaying, on the basis of a detection result for the first scanning line by the detection circuit, the one part of the image data to be displayed by the cholesteric liquid crystal on each of a plurality of first scanning lines by driving the cholesteric liquid crystal on each of the plurality of first scanning lines in accordance with a first cycle consisting of a reset period for resetting the cholesteric liquid crystal in the H-orientation, a selection period for selecting the cholesteric liquid crystal, which is reset in the H-orientation, in a TP orientation, and a holding period for holding the cholesteric liquid crystal, which is selected in the TP orientation, in the F-orientation and in accordance with a second cycle consisting of a reset period for resetting the cholesteric liquid crystal in the H-orientation, a selection period for selecting the cholesteric liquid crystal, which is reset in the H-orientation, in the H-orientation, and a holding period for holding the cholesteric liquid crystal, which is selected in the H-orientation, in the P-orientation and by sequentially selecting and driving the plurality of first scanning lines using a pipeline system such that the selection periods do not overlap with each other during each of the reset period, the selection period, and the holding period in the first and second cycles; and
a second driving circuit for displaying, on the basis of a detection result for the second scanning line by the detection circuit, the other part of the image data to be displayed by the cholesteric liquid crystal on each of a plurality of second scanning lines by driving the cholesteric liquid crystal on each of the plurality of second scanning lines in accordance with a third cycle consisting of a reset period for resetting the cholesteric liquid crystal in the H-orientation and a holding period for holding the cholesteric liquid crystal, which is reset in the H-orientation, in the F-orientation or in accordance with a fourth cycle consisting of a reset period for resetting the cholesteric liquid crystal in the H-orientation, the cholesteric liquid crystal, which is reset in the H-orientation, being transit to the TP orientation at the end of the reset period, and by collectively selecting and driving the plurality of second scanning lines during each of the reset period and the holding period in the third and fourth cycles or by sequentially selecting and driving the plurality of second scanning lines by shifting by the selection period during each of the reset period and the holding period in the third and fourth cycles.

2. A cholesteric liquid crystal driving method comprising:

a detection step of detecting a first scanning line and a second scanning line, wherein, in image data having two or more gray levels to be displayed by a plurality of cholesteric liquid crystals provided at intersections of a plurality of scanning lines and a plurality of data lines, the orientation of each of the plurality of cholesteric liquid crystals being defined in a P-orientation, an F-orientation, or an H-orientation in accordance with a voltage between the corresponding scanning lines and the corresponding data lines, one part of the image data corresponding to a cholesteric liquid crystal on the first scanning line has different gray levels other than a halftone and another part of the image data corresponding to a cholesteric liquid crystal on the second scanning line has the same gray level other than the halftone;

a first driving step of displaying, on the basis of a detection result for the first scanning line by the detection step, the one part of the image data to be displayed by the cholesteric liquid crystal on each of a plurality of first scanning lines by driving the cholesteric liquid crystal on each of the plurality of first scanning lines in accordance with a first cycle consisting of a reset period for resetting the cholesteric liquid crystal in the H-orientation, a selection period for selecting the cholesteric liquid crystal, which is reset in the H-orientation, in a TP orientation, and a holding period for holding the cholesteric liquid crystal, which is selected in the TP orientation, in the F-orientation and in accordance with a second cycle consisting of a reset period for resetting the cholesteric liquid crystal in the H-orientation, a selection period for selecting the cholesteric liquid crystal, which is reset in the H-orientation, in the H-orientation, and a holding period for holding the cholesteric liquid crystal, which is selected in the H-orientation, in the P-orientation and by sequentially selecting and driving the plurality of first scanning lines using a pipeline system such that the selection periods do not overlap with each other during each of the reset period, the selection period, and the holding period in the first and second cycles; and a second driving step of displaying, on the basis of a detection result for the second scanning line by the detection step, the other part of the image data to be displayed by the cholesteric liquid crystal on each of a plurality of second scanning lines by driving the cholesteric liquid crystal on each of the plurality of second scanning lines in accordance with a third cycle consisting of a reset period for resetting the cholesteric liquid crystal in the H-orientation and a holding period for holding the cholesteric liquid crystal, which is reset in the H-orientation, in the F-orientation or in accordance with a fourth cycle consisting of a reset period for resetting the cholesteric liquid crystal in the H-orientation, the cholesteric liquid crystal, which is reset in the H-orientation, being transit to the TP orientation at the end of the reset period, and by collectively selecting and driving the plurality of second scanning lines during each of the reset period and the holding period in the third and fourth cycles or by sequentially selecting and driving the plurality of second scanning lines by shifting by the selection period during each of the reset period and the holding period in the third and fourth cycles.

* * * * *